(12) United States Patent
Palmer et al.

(10) Patent No.: US 10,715,010 B2
(45) Date of Patent: Jul. 14, 2020

(54) MOTOR CONTROLLER CAN WITH SYNTHETIC HOUSING AND METAL HEAT SINK

(71) Applicant: Nidec Motor Corporation, St. Louis, MO (US)

(72) Inventors: Steven R. Palmer, Highland, IL (US); Chetan O. Modi, Valley Park, MO (US); Jeffrey S. Sherman, Creve Coeur, MO (US); Douglas D. Glenn, Highland, IL (US); Richard Eason, Ballwin, MO (US)

(73) Assignee: Nidec Motor Corporation, St. Louis, MO (US)

( * ) Notice: Subject to any disclaimer, the term of this patent is extended or adjusted under 35 U.S.C. 154(b) by 333 days.

(21) Appl. No.: 15/891,010

(22) Filed: Feb. 7, 2018

(65) Prior Publication Data

US 2018/0226861 A1 Aug. 9, 2018

Related U.S. Application Data

(60) Provisional application No. 62/456,005, filed on Feb. 7, 2017.

(51) Int. Cl.
*H02K 1/32* (2006.01)
*H02K 9/18* (2006.01)
*H02K 11/33* (2016.01)
*H02K 5/06* (2006.01)
*H02K 9/22* (2006.01)
*H02K 1/27* (2006.01)
*H02K 5/173* (2006.01)

(52) U.S. Cl.
CPC ............. *H02K 9/18* (2013.01); *H02K 5/06* (2013.01); *H02K 11/33* (2016.01); *H02K 1/2766* (2013.01); *H02K 5/1737* (2013.01); *H02K 9/22* (2013.01); *H02K 2203/03* (2013.01)

(58) Field of Classification Search
CPC . H02K 11/33; H02K 5/18; H02K 5/06; H02K 1/2766; H02K 5/1737; H02K 9/22; H02K 2203/03
USPC ................................. 310/64, 71, 89
See application file for complete search history.

(56) References Cited

U.S. PATENT DOCUMENTS

| | | | | |
|---|---|---|---|---|
| 4,724,347 A * | 2/1988 | Reinhardt | ............. | H02K 9/00 310/216.114 |
| 7,859,147 B2 * | 12/2010 | Dubuc | ............. | H02K 11/048 310/68 D |
| 7,911,093 B2 * | 3/2011 | Schueren | ............. | H02K 5/225 310/68 R |
| 8,348,640 B2 * | 1/2013 | Marioni | ............. | F04D 25/082 417/423.14 |
| 8,552,604 B2 * | 10/2013 | Matsuda | ............. | B62D 5/0406 310/43 |
| 8,659,194 B2 * | 2/2014 | Motoda | ............. | H02K 11/33 310/64 |
| 9,973,060 B2 * | 5/2018 | Aso | ............. | H02K 5/15 |

* cited by examiner

*Primary Examiner* — Thanh Lam
(74) *Attorney, Agent, or Firm* — Hovey Williams LLP (57) ABSTRACT

An electric motor including a rotor, a stator, a motor housing having a controller can, and a controller having an electronic component disposed within the controller can. The controller can includes an insert comprising thermally conductive metal for exchanging heat with an external heat sink space.

20 Claims, 12 Drawing Sheets

MOTOR CONTROLLER CAN WITH SYNTHETIC HOUSING AND METAL HEAT SINK

CROSS-REFERENCE TO RELATED APPLICATION

The present application claims the benefit of and priority from identically-titled U.S. Provisional Patent Application Ser. No. 62/456,005, filed Feb. 7, 2017, the entire disclosure of which is hereby incorporated by reference herein.

BACKGROUND OF THE INVENTION

Field of the Invention

The present invention relates generally to an electric motor. More particularly, the present invention relates generally to an electric motor having a controller can that includes a metal heat sink insert and houses at least one electronic component.

Discussion of the Related Art

Electric motors are conventionally used in applications including but not limited to heating, ventilation, and air conditioning (HVAC) systems; pumps; and home appliances. Such a motor may include electronic components comprising a controller for controlling at least some operations of the motor. The controller may be housed in a controller can defining a controller compartment. Operation of the controller generates thermal heat as well as conductive and radiated electromagnetic interference (EMI).

Conventional methods for dispelling thermal heat from the controller compartment may include forming openings and/or fins in the can. Moreover, conventional approaches to addressing unwanted EMI include component-based suppression (for example, common-mode choke(s), ceramic capacitor(s) between motor terminals, intervening complex filters between components comprising inductors, capacitor and/or varistors). It is also known that connecting one or more component(s) to a ground wire may provide some improvement in EMI emissions.

SUMMARY

According to one aspect of the present invention, an electric motor is provided for improved heat exchange. The motor includes a rotor, a stator, a motor housing including a controller can, and a controller including an electronic component. The electronic component is disposed within the controller can. The controller can includes a metal insert thermally connected to the electronic component.

According to another aspect of the present invention, an electric motor is provided for improved heat exchange. The motor includes a rotor, a stator, and a motor housing including a controller can. The controller can has an end plate and a metal insert extending substantially transversely from the end plate. The metal insert comprises thermally conductive material. The end plate comprises a thermally insulative material having a thermal conductivity at least four (4) times less than that of the thermally conductive material.

This summary is provided to introduce a selection of concepts in a simplified form. These concepts are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

Preferred embodiments of the present invention are described in detail below with reference to the attached drawing figures, wherein.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments. For instance, the drawing figures do not limit the present invention to the specific embodiments disclosed and described herein. The drawings are not necessarily to scale, emphasis instead being placed upon clearly illustrating the principles of the preferred embodiments. Furthermore, directional references (for example, top, bottom, up, and down) are used herein solely for the sake of convenience and should be understood only in relation to each other. For instance, a component might in practice be oriented such that faces referred to as "top" and "bottom" are sideways, angled or inverted relative to the chosen frame of reference.

Turning to FIGS. 1-4, an electric motor 12 according to the present inventive concept is illustrated. The motor 12 preferably includes a rotor 14, a stator 16 and a shaft 18. The rotor 14 is preferably rotatable about an axis at least in part defined by and/or along the shaft 18. However, an alternative rotation axis is permissible according to the present invention. For instance, a rotation axis might at least in part be parallel to, but spaced from, a shaft.

In a preferred embodiment, as illustrated, the motor 12 is an inner rotor motor. It is permissible, however, for an outer rotor motor, a dual rotor motor, or an alternatively configured motor to be used. The motor 12 may be operatively coupled to any one of a variety of machines, including but not limited to pool and spa pumps, furnace blowers, geothermal heat pumps, fan coil drivers, ventilators and/or filter units.

The motor 12 includes a motor housing 20 broadly having a first endshield 22, a second endshield 24 (see FIG. 4) a shell 26 extending between the endshields 22 and 24, and a controller can 28. The endshields 22, 24 and the shell 26 each preferably comprise steel, although other materials (for example, plastic or aluminum) may be used without departing from the scope of some aspects of the present invention. Most preferably, the endshields 22, 24 and the shell 26 comprise stamped steel. The controller can 28 will be discussed in more detail below.

Figure 1:
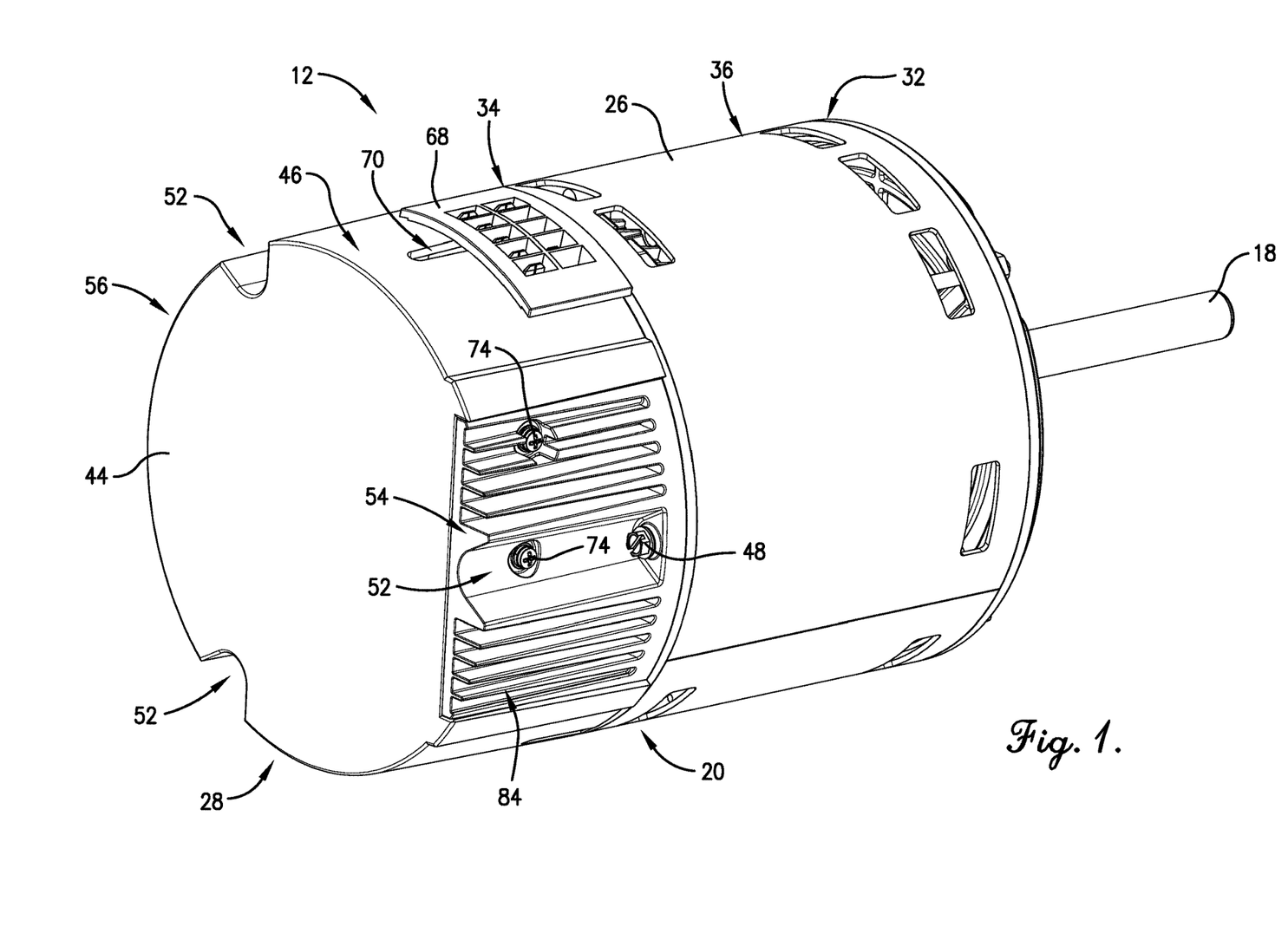
FIG. 1 is a rear perspective view of a motor in accordance with a preferred embodiment of the present invention.
Figure 2:
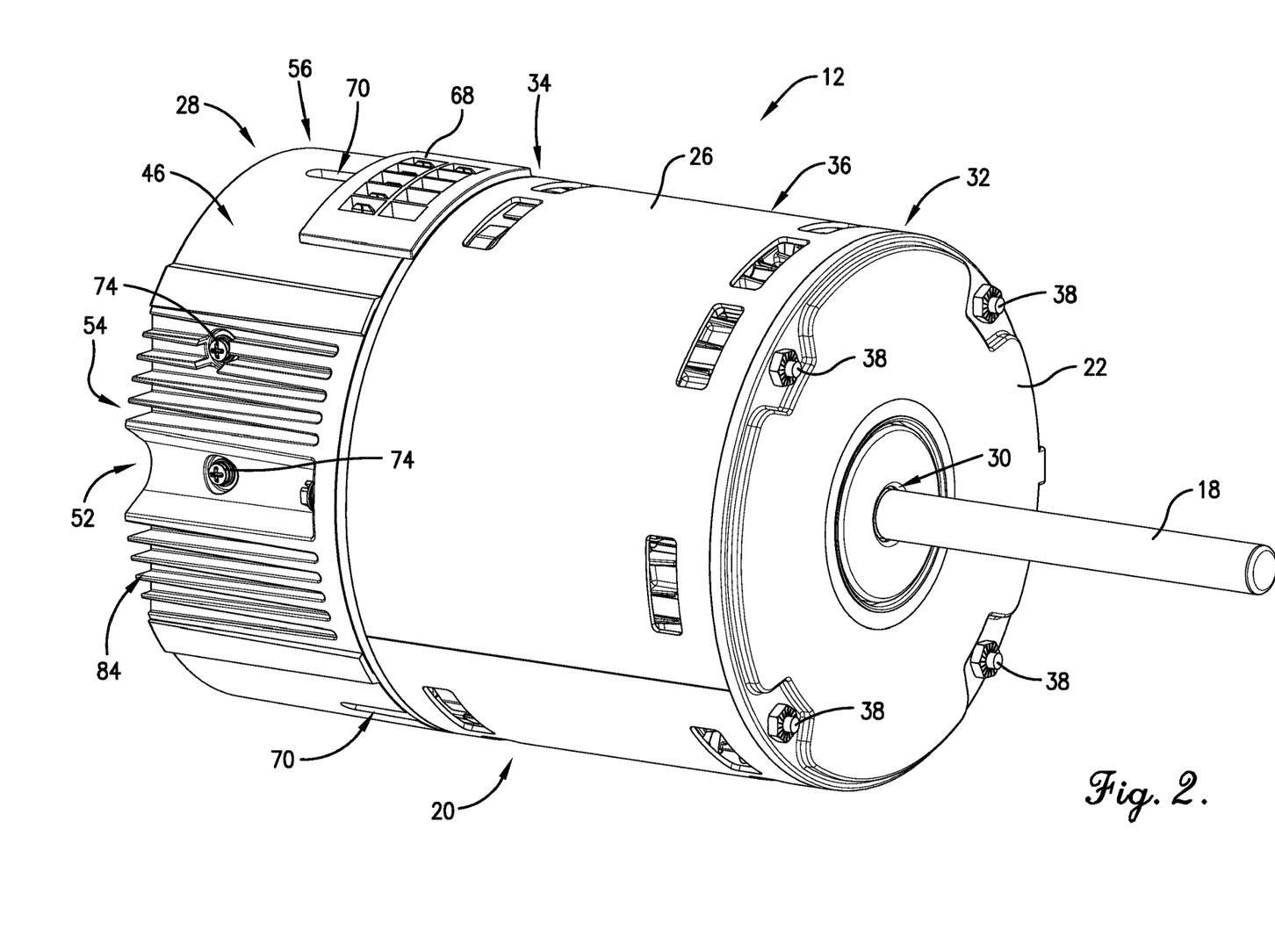
FIG. 2 is a front perspective view of the motor of FIG. 1.
Figure 3:
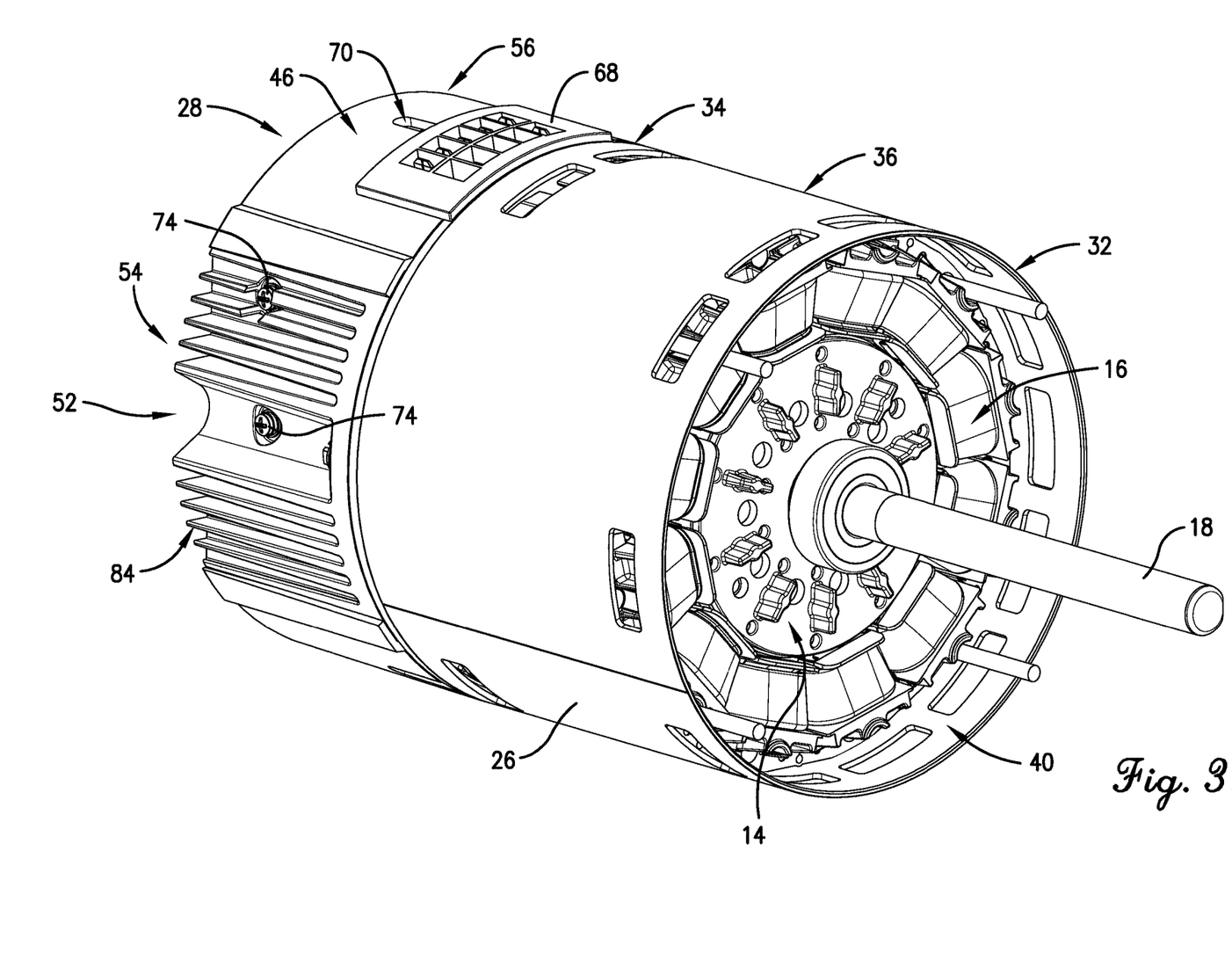
FIG. 3 is a front perspective view of the motor of FIG. 2, with a first endshield removed to particularly illustrate internal motor components.
Figure 4:
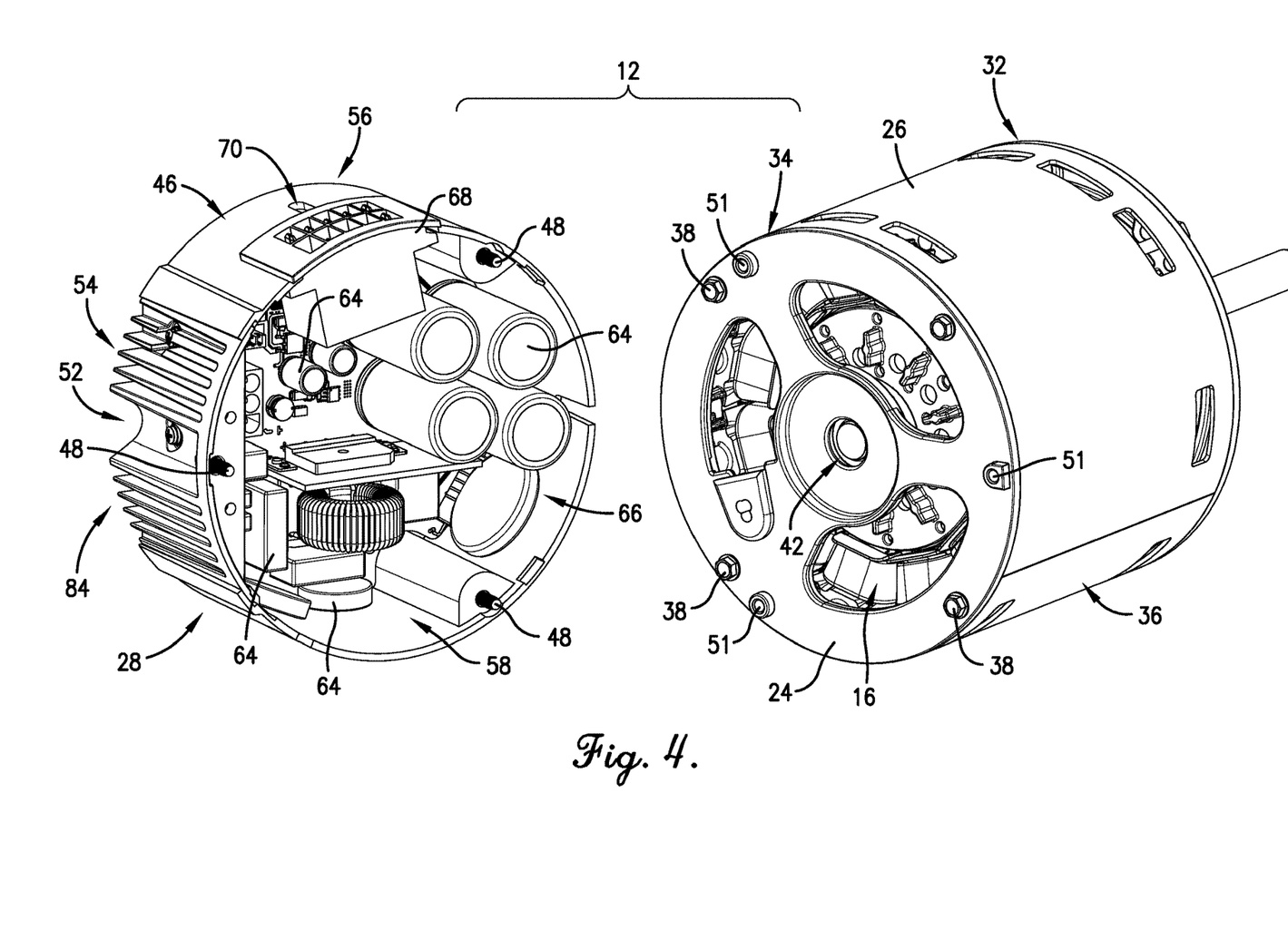
FIG. 4 is a partially exploded rear perspective view of the motor of FIGS. 1-3, particularly illustrating a second endshield partially defining a stator compartment and a controller can defining a controller compartment.

As best shown in FIGS. 3-4, the stator 16 is positioned axially between the endshields 22 and 24, as well as between the first endshield 22 and the can 28. The shell 26 is preferably likewise positioned axially between the first endshield 22 and the can 28. The first endshield 22 preferably defines a shaft opening 30. The shaft 18 preferably extends through the shaft opening 30.

The shell 26 preferably presents a generally radially extending first axial end 32, a generally radially extending second axial end 34 spaced axially from the first axial end 32, and a shell margin 36 extending generally circumferentially between the first and second axial ends 32 and 34. The shell 26 preferably extends generally circumferentially along the shell margin 36 so as to at least in part circumscribe the stator 16. The shell margin 36 is preferably defined by the outer circumferential face of the shell 26 and is therefore substantially curved. Although the shell margin 36 is preferably at least in part structurally defined, continuous structural definition is not required according to some aspects of the present invention, for instance in embodiments where a shell includes one or more ventilation slots.

The first endshield 22 preferably is secured relative to the shell 26 adjacent the first axial end 32. That is, the first endshield 22 preferably extends generally radially adjacent the first axial end 32 across the opening presented by the shell 26 at the first axial end 32.

The first endshield 22 (with the exception of the shaft opening 30) is preferably at least substantially solid in construction. (See FIG. 2) Passage of contaminants through the first endshield 22 to the stator 16 is thereby at least substantially restricted. It is permissible according to some aspects of the present invention, however, for openings to be formed in a first endshield for any one or more of a variety of purposes, including but not limited to heat dispersion or ventilation. The endshields 22, 24 are preferably secured to shell 26 with a plurality of arcuately spaced bolts 38, though it is foreseen that any one or more of a variety of fasteners or connection types—for example, buckles, clamps, clasps, clips, latches, nails, pins, rings, straps, welds and/or friction fits—may be employed without departing from the spirit of the present inventive concept.

Turning specifically to FIG. 4, the second endshield 24 preferably extends generally radially along the second axial end 34. Thus, the first endshield 22, the second endshield 24, and the shell 26 cooperatively at least partially define a stator compartment 40. (See FIG. 3) The stator compartment 40 at least partially, and preferably substantially completely, encloses the stator 16 therein.

The second endshield 24 preferably defines a bearing-receiving structure 42. A bearing (partially obscured in FIG. 4) is preferably received in the bearing-receiving structure 42. The bearing-receiving structure 42 preferably cooperates with another bearing-receiving structure (not shown) defined by the first endshield 22 to rotatably support the shaft 18 and other rotor 14 components generally within the compartment 40. The bearings may be of any type suited to the particular application. For instance, the bearings might be bushings or ball bearings.

The controller can 28 preferably includes a generally radially extending end plate 44 (see FIG. 1) and a generally axially extending skirt 46 projecting transversely from the end plate 44 toward the shell 26. The can 28—and, more particularly, the skirt 46—presents a can diameter. Preferably, the can diameter is at least substantially constant and symmetrical about and along the rotational axis, although variation is permissible within the scope of the present invention. For instance, a skirt might expand in a linear manner or be flared, and/or fins may be incorporated asymmetrically thereabout, without departing from the spirit of the present invention.

The shell 26 similarly presents a shell diameter. Preferably, the shell diameter is at least substantially constant and symmetrical about and along the rotational axis, although variation is permissible within the scope of the present invention. For instance, the shell might expand in a linear manner or be flared within the scope of the present invention.

Preferably, the can diameter and the shell diameter are substantially equal at the adjacent ends of the can 28 and the shell 26. That is, the can diameter immediately adjacent the second axial end 34 is preferably substantially equal to the shell diameter immediately adjacent the second axial end 34. Further, the second endshield 24 preferably presents an outer diameter that is at least substantially equal to the immediately adjacent shell and can diameters at the second axial end 34. Thus, the skirt 46, the second endshield 24, and the shell 26 may meet at one or more substantially continuous circumferentially-extending interface(s) at the second axial end 34 that enable electrical and thermal communication therebetween, it being understood that any such communication with the skirt 46 may be limited by the material used to construct the skirt 46.

Preferably, the motor 12 includes fasteners 48 that extend through and interconnect the second endshield 24 and the can 28. Preferably, the fasteners 48 are arcuately spaced apart. More preferably, the fasteners 48 are evenly arcuately spaced apart. Alternative arrangements, including irregular arrangements, are permissible according to some aspects of the present invention, however. Fasteners 48 preferably comprise bolts, though it is foreseen that any one or more of a variety of fasteners or other connection types—for example, buckles, clamps, clasps, clips, latches, nails, pins, rings, straps, welds and/or friction fits—may be employed without departing from the spirit of the present inventive concept.

Figure 9:
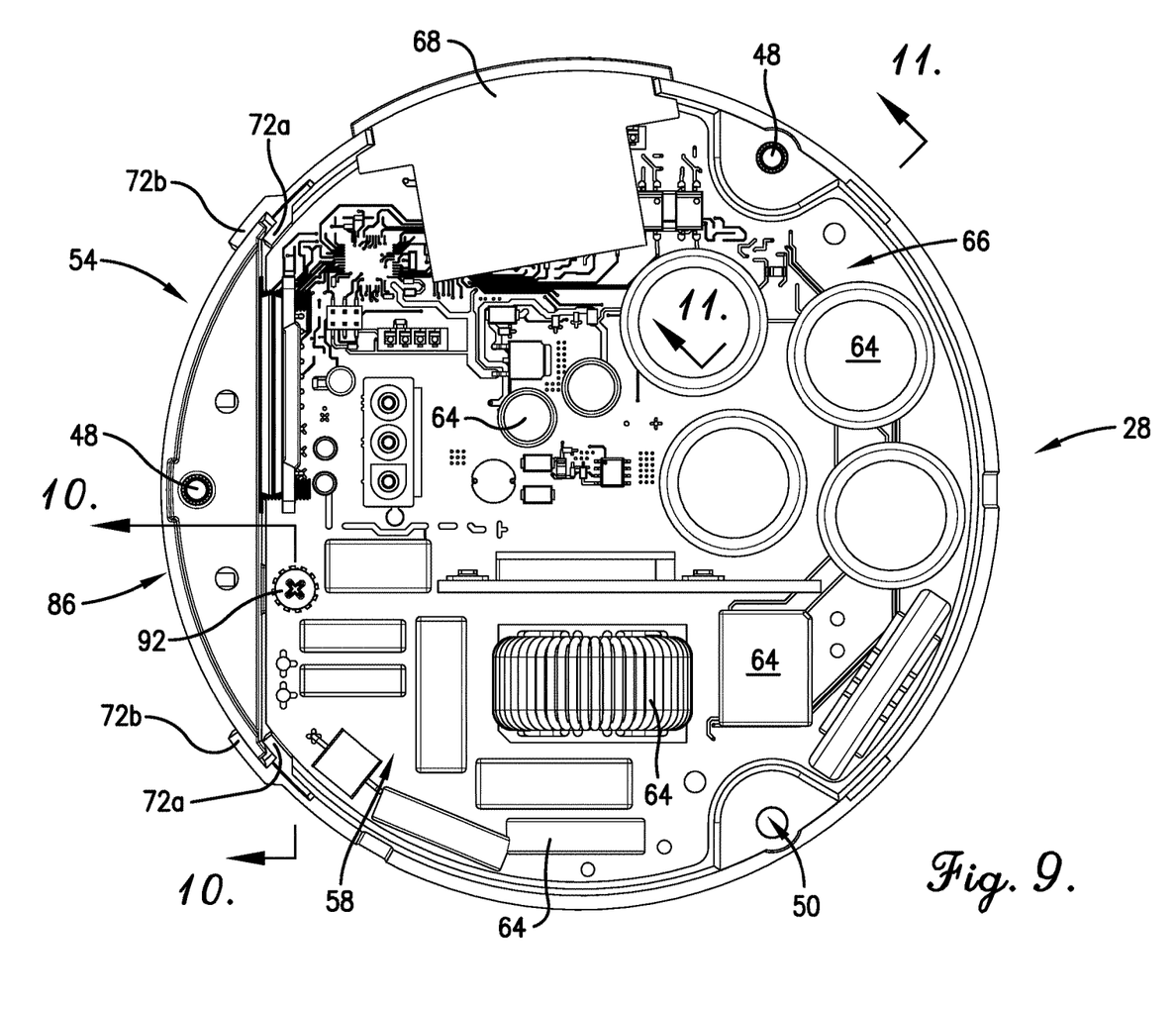
FIG. 9 is a top view of the controller can of FIG. 5.
Figure 10:
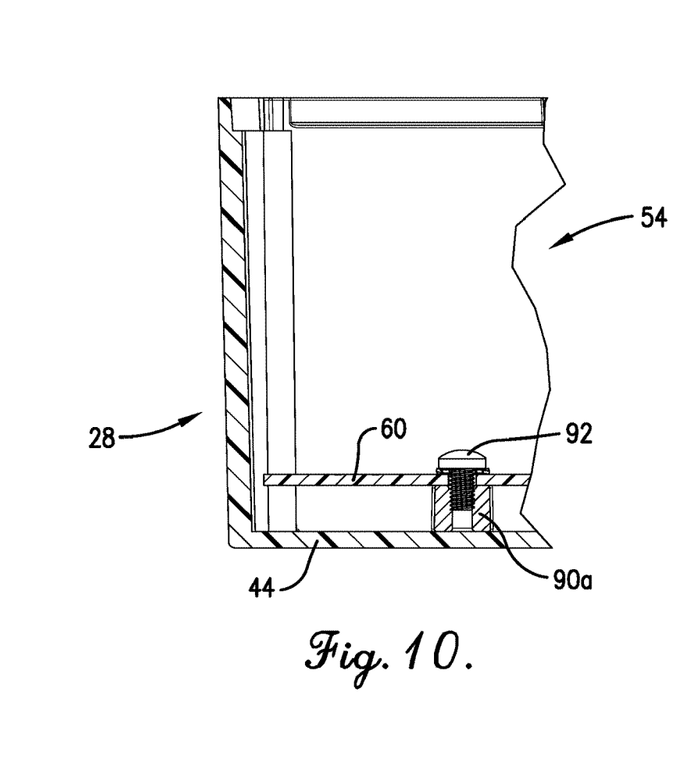
FIG. 10 is an enlarged side cross-sectional view of a portion of the controller can taken along line 10-10 in FIG. 9, particularly illustrating the first spacer and the mounted printed circuit board secured to the first spacer.
Figure 11:
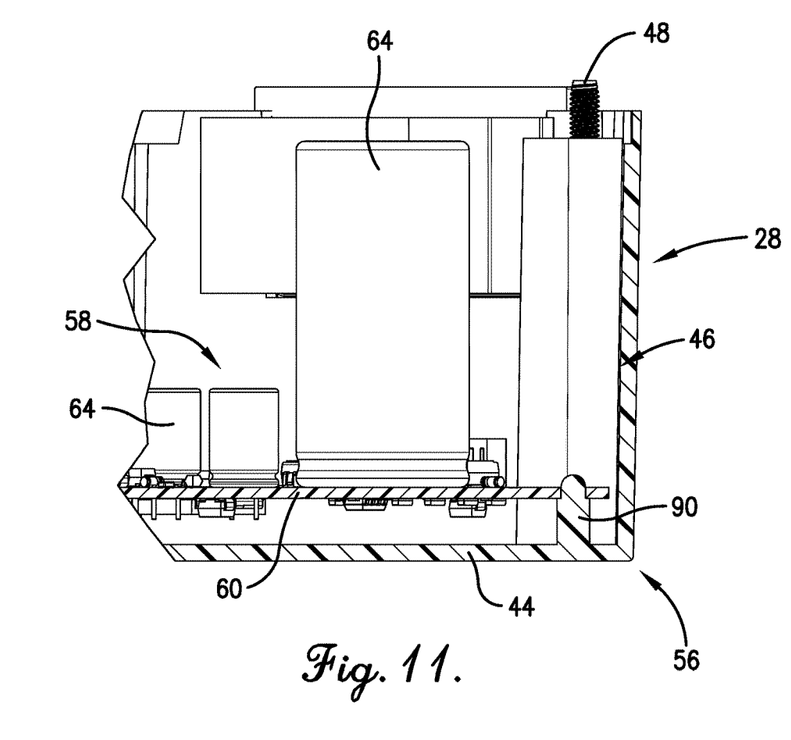
FIG. 11 is an enlarged side cross-sectional view of a portion of the controller can taken along line 11-11 of FIG. 9, particularly illustrating a second spacer and the printed circuit board mounted to the second spacer.
Figure 12:
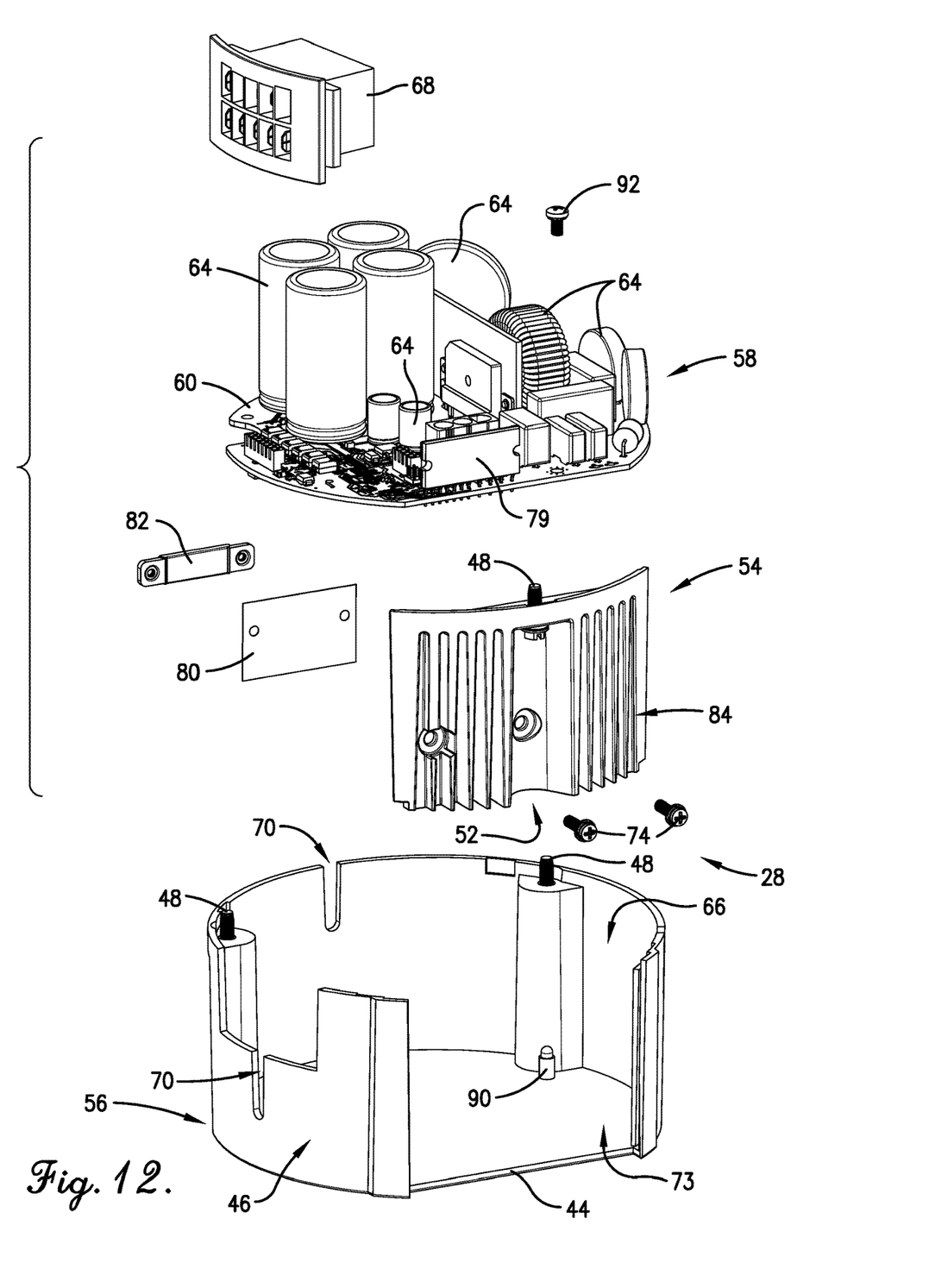
FIG. 12 is a partially exploded side perspective view of the controller can of FIG. 5, particularly illustrating aspects and contents of the controller can.

In keeping with the above preferred fastener 48 configuration, the can 28 preferably defines a plurality of fastener-receiving openings 50 (see FIG. 9), and the second endshield 24 preferably includes a plurality of corresponding and aligning fastener-receiving bosses 51. The can 28 also preferably includes a plurality of recesses 52 to allow passage of the fasteners 48 thereby and to facilitate attachment of the fasteners 48 using traditional tools.

Figure 5:
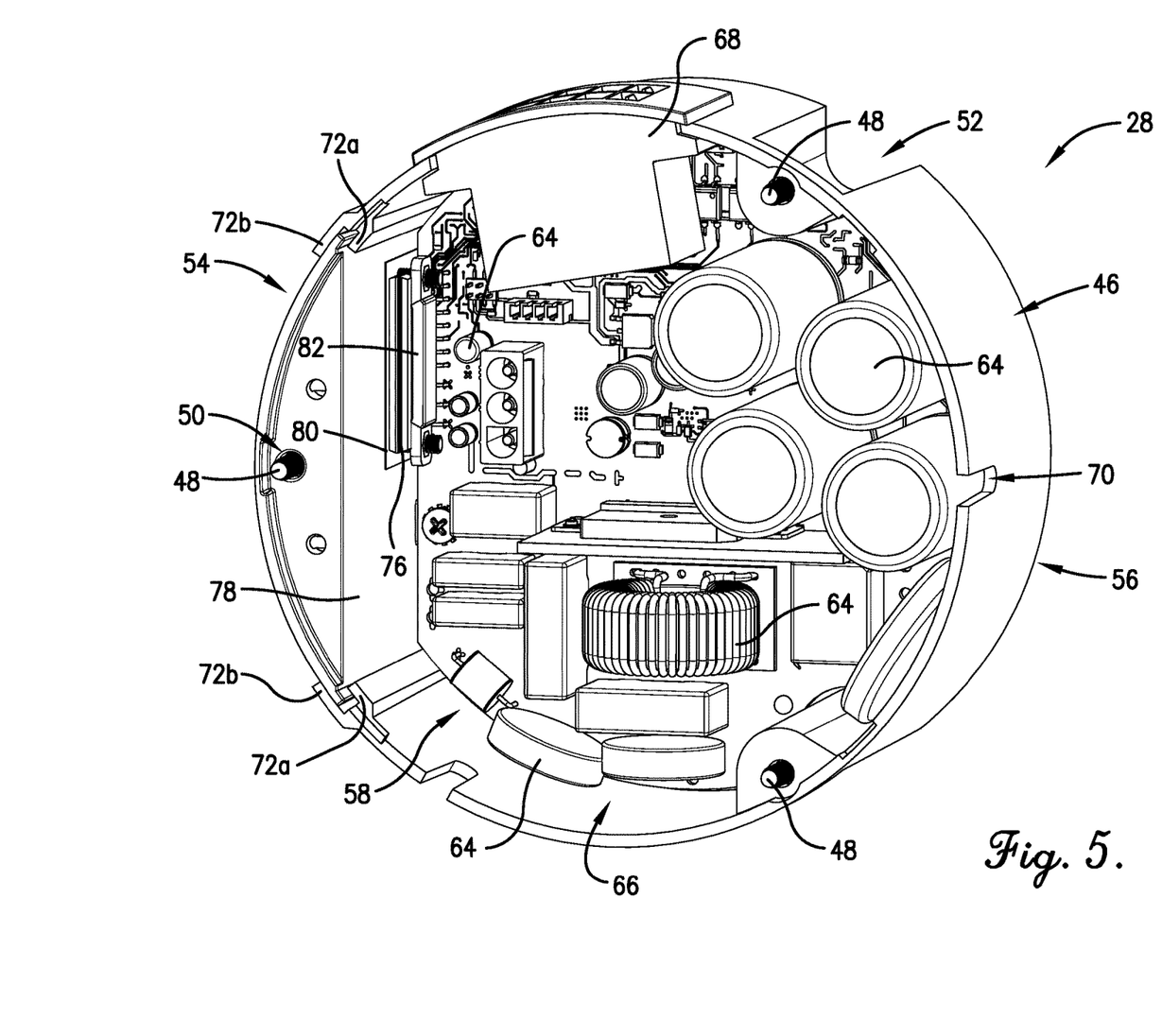
FIG. 5 is an enlarged front perspective view of the controller can of FIG. 4, particularly illustrating a metal insert of the controller can and electronic components of a controller disposed in the controller can.
Figure 6:
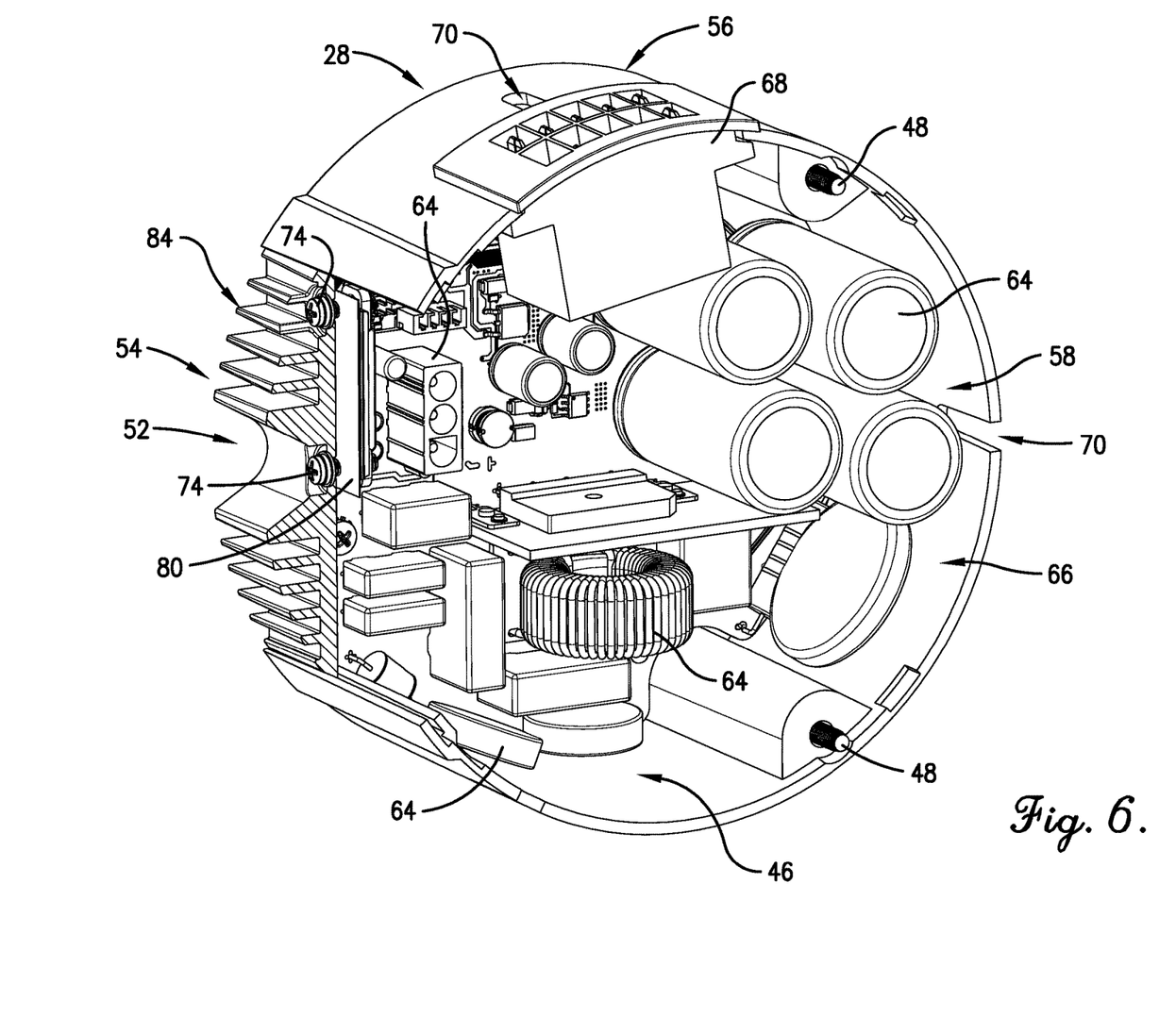
FIG. 6 is a rotated, partially-sectioned front perspective view of the controller can of FIG. 5, particularly illustrating surfaces for conducting heat from at least one of the electronic components to the metal insert.
Figure 7:
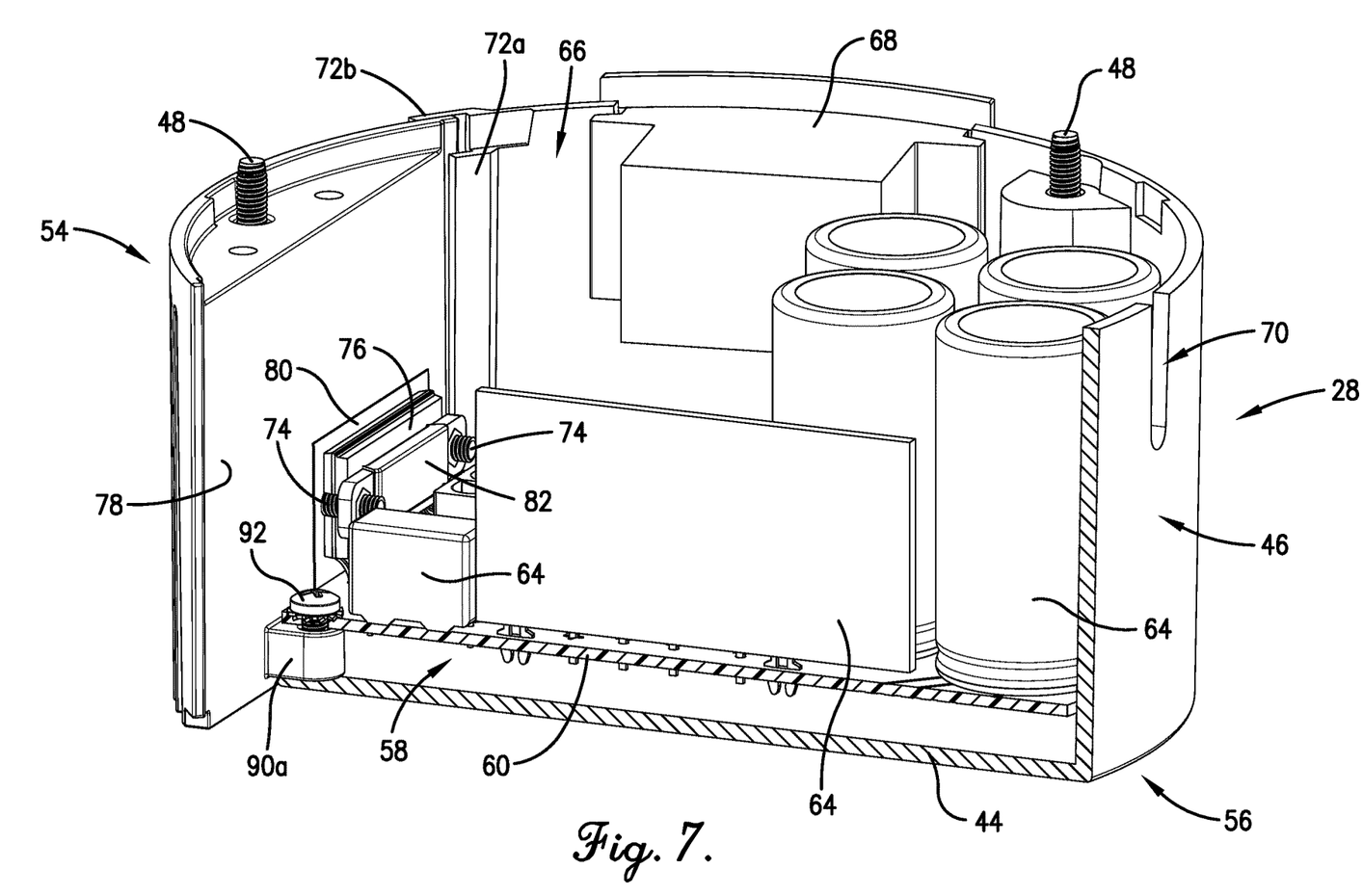
FIG. 7 is a partially-sectioned side perspective view of the controller can of FIG. 5, particularly illustrating a first spacer integral with the metal insert and a printed circuit board mounted to the first spacer.
Figure 8:
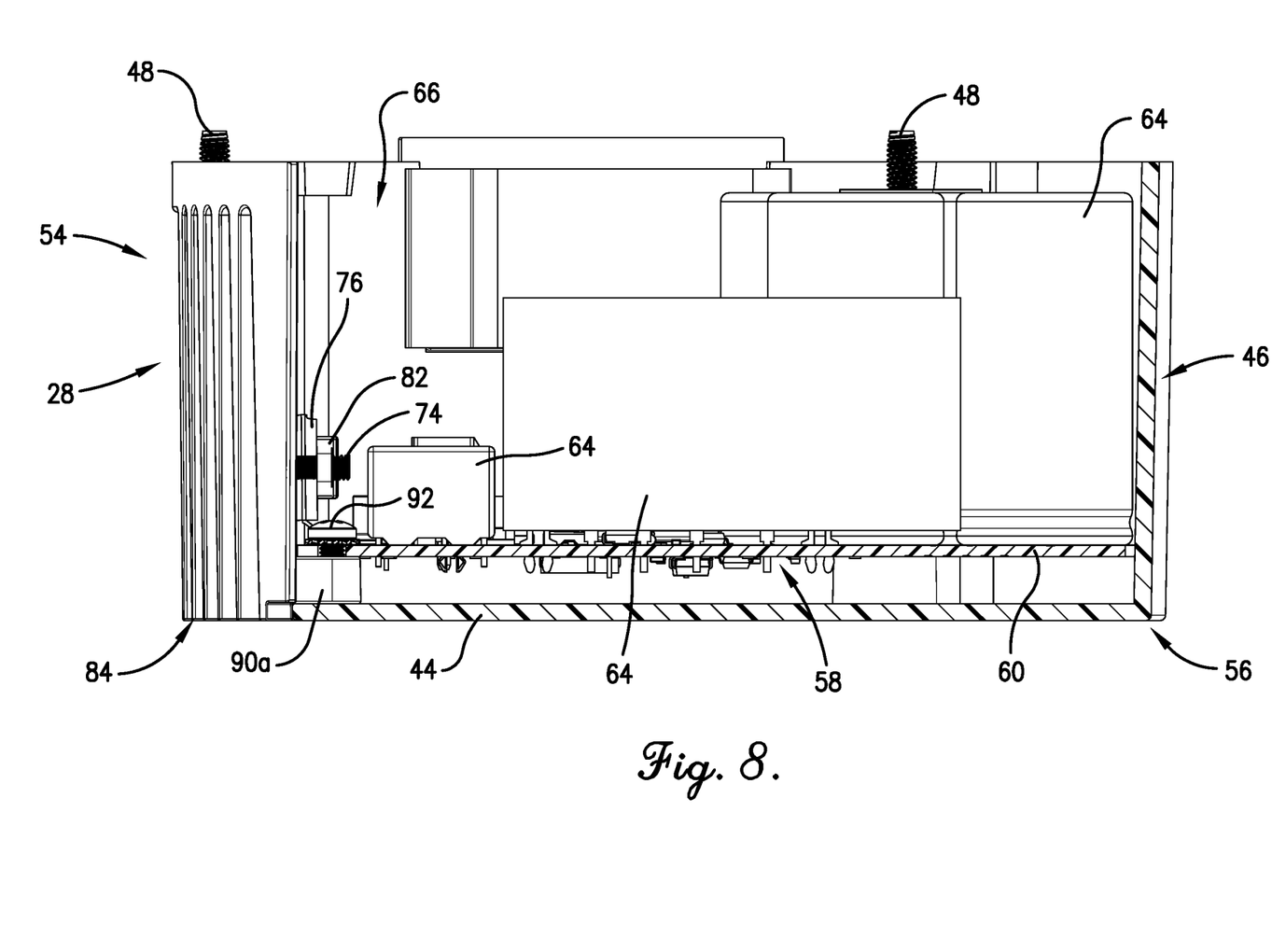
FIG. 8 is a partially-sectioned side view of the controller can of FIG. 7.

Turning briefly to FIG. 5, the can 28 preferably defines at least one can fastener-receiving opening 50 for securing a metal insert 54 (discussed in more detail below). For instance, a can housing 56 (also discussed in more detail below) may define two can fastener-receiving openings 50, and the metal insert 54 may define a third fastener-receiving opening 50. In this manner, at least one fastener 48 preferably holds the metal insert 54 against the second endshield 24 and/or the second axial end 34 of the shell 26. At least the fastener(s) 48 extending through the metal insert 54 are preferably comprised of thermally and/or electrically-conductive materials. More preferably, such fastener(s) 48 comprise copper and/or steel, though it is foreseen that other materials such as aluminum may be used without departing from the spirit of the present invention.

Figure 13:
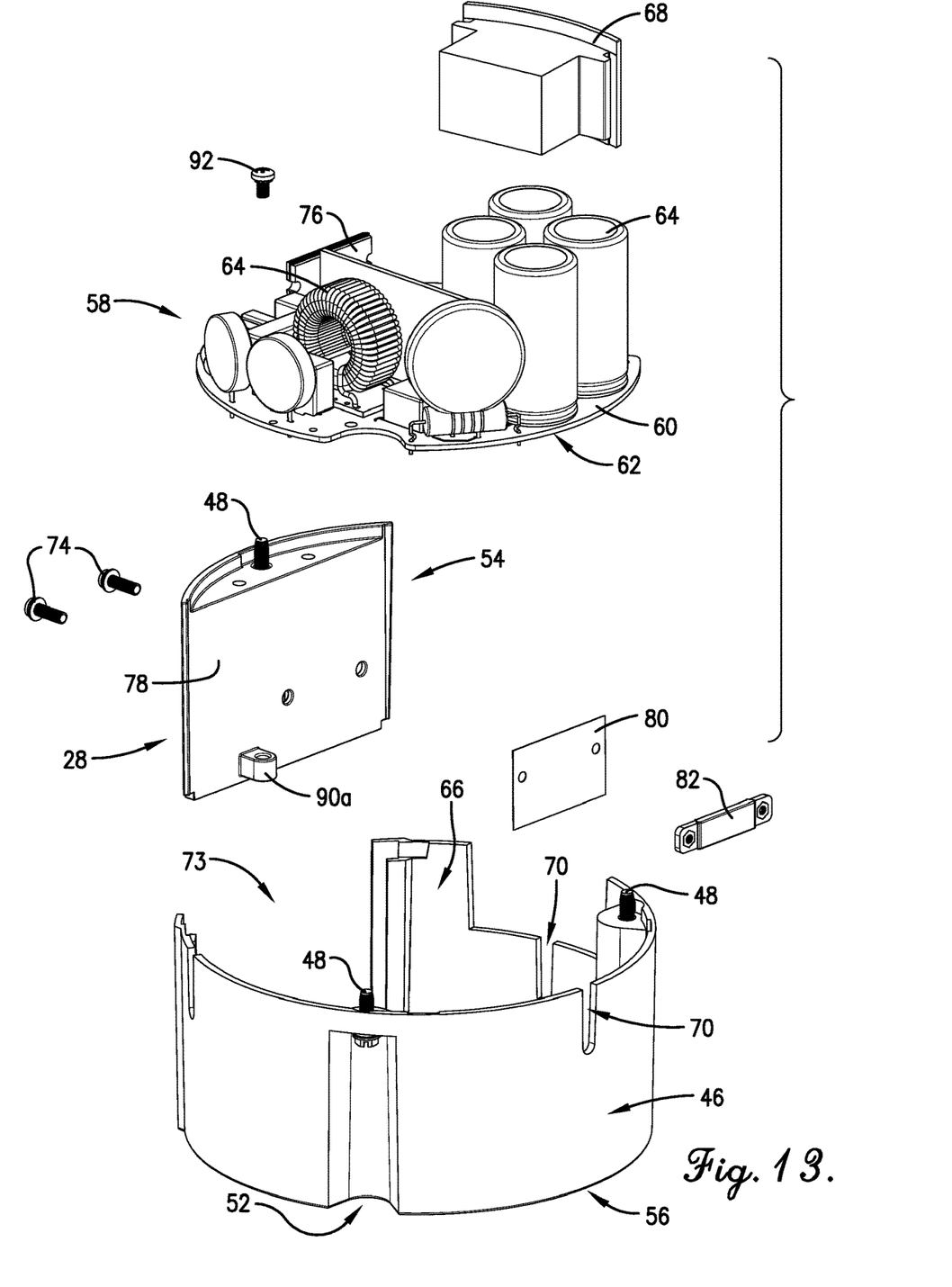
FIG. 13 is rotated partially exploded side perspective view of the controller can of FIG. 12.

The motor 12 preferably also includes a controller 58. In a preferred embodiment, the controller 58 includes a substantially planar printed circuit board (PCB) 60 presenting an outer perimeter 62. (See FIG. 13) The controller 58 further preferably includes a plurality of electronics components 64 mounted on the PCB 60. The electronics components 64 may include primary control and/or pilot control devices, such as a power module (discussed in more detail below), a motor starter, float switches, pressure switches, magnetic contactors, contactor coils, circuit breakers and/or overload relays. However, any of a variety of controller types, configurations and components are permissible according to some aspects of the present invention.

The can 28 preferably partly or completely defines a controller compartment 66 in which the controller 58 is disposed. More particularly, the skirt 46 and the metal insert 54 at least substantially circumscribe the controller 58, with the controller 58 being disposed between the end plate 44 and the second endshield 24.

In a preferred embodiment, a connector element 68 is connected to the can 28. The connector element 68 is preferably configured for interconnection with an electrical conduit (not shown) and controller 58. More preferably, the connector element 68 is configured to carry power and control/configuration signals to and/or from the controller 58 for use in operation of the motor 12. However, it is within the scope of the present invention for a connector element to be configured for any required connection or to be excluded entirely from the motor. It is also permissible for an element to connect to a motor or housing at an alternative location.

The skirt 46 preferably defines one or more drainage holes 70 in fluid communication with controller compartment 66 to enable improved drainage of fluid from the compartment 66 (for example, to drain excessive condensation formed on the controller 58 and/or the second endshield 24). As will be readily apparent to those of ordinary skill in the art, the efficiency or, more broadly, the effectiveness of the drainage holes 70 will be at least in part dependent on their orientation. For instance, the illustrated drainage holes 70 are arcuately spaced around the radial perimeter of the can 28 and permit gravity to direct fluid away from the controller compartment 66 when the can 28 is in a variety of orientations. It is, however, foreseen that drainage holes and/or tubes may be defined and/or positioned within and about a controller can in a variety of configurations without departing from the spirit of the present inventive concept. For instance, drainage tubes may penetrate a PCB and potting (as applicable) for directing condensed water from an end plate-side of the printed circuit board toward drainage holes adjacent a second endshield.

Turning now to FIGS. 5-13, the can 28 preferably includes the metal insert 54 and the can housing 56. The can housing 56 preferably includes two pairs of opposing flanges 72 extending generally axially along either side of an opening 73 in the can housing 56. Each pair of flanges 72 includes an inner flange 72a radially spaced from an outer flange 72b that define a U- or V-shaped slot therebetween. The opposing flanges 72 are configured to receive the metal insert 54 within the slots and to at least partly secure the metal insert 54 against radial and/or circumferential movement with respect to the housing 56. (See FIG. 9) In an assembled motor 12, the metal insert 54 is preferably press fit into the slots formed by the flanges 72. Preferably, the metal insert 54 also defines at least one of the arcuately spaced recesses 52 through which a fastener 48 may be accessed for securement of the metal insert 54 to the second endshield 24 and/or the shell 26. (See FIG. 1) More particularly, the metal insert 54 is preferably secured to the second endshield 24 (and thereby the shell 26) by one or more fasteners 48.

The metal insert 54 is also secured to the can housing 56 and/or components 64 housed therein by fasteners 74, which may substantially restrict axial movement of the metal insert 54 with respect to the skirt 46. Fasteners 74 preferably comprise bolts, though it is foreseen that any one or more of a variety of fasteners or other connection types—for example, buckles, clamps, clasps, clips, latches, nails, pins, rings, straps, welds and/or friction fits—may be employed without departing from the spirit of the present inventive concept. The fasteners 74 may assist with thermal transfer between the controller 58 and the metal insert 54, and/or may provide grounding for the controller 58 to assist with controlling EMI emissions. The fasteners 74 therefore preferably comprise thermally and/or electrically conductive metal(s).

In the preferred embodiment, the fasteners 74 may be directly or indirectly fixed to a power module 76 (described below) of the controller 58 for transferring heat and/or EMI emissions to the insert 54 and/or an exterior of the can 28. One of ordinary skill will appreciate that grounding the controller 58 using the fasteners 74 may be achieved at least in part via contact between the fasteners 74 and the metal insert 54, and between the metal insert 54 and the shell 26 (whether directly and/or through the second endshield 24). One of ordinary skill will appreciate that other methods and/or structures for securing a metal insert to a controller can, electronic components, endshield and/or shell—and/or to a motor more generally—are within the scope of the invention. For instance, a metal insert may be welded to a can housing without departing from the spirit of the present invention.

The metal insert 54 is preferably exposed to the exterior of the can 28, which may be an ambient environment and/or other heat sink. That is, the exterior of the can 28 is preferably capable of acting as a heat sink to absorb heat in order to support rapid heat transfer from the can 28 to an external heat sink space. The metal insert 54 preferably at least partially radially circumscribes the controller compartment 66 to provide surface area and a medium for heat transfer to the external heat sink space. Moreover, the metal insert 54 extends axially along a substantial portion of the controller compartment 66, again to provide surface area for heat transfer to the external heat sink space. (See FIG. 1) Preferably, the metal insert 54 presents between about ten percent (10%) and about forty percent (40%) of the surface area of the can 28 that faces external heat sink space (for example, the ambient environment), otherwise referred to herein as "exposed surface area," with the remainder being presented by the can housing 56. More preferably, the metal insert 54 presents between about twenty percent (20%) and about thirty percent (30%) of the exposed surface area of the can 28. The illustrated metal insert 54 spans roughly one and forty-five hundredths (1.45) radians or about eighty-three degrees (83°) of the circumference of the can 28 and extends substantially from the end plate 44 to the second endshield 24. It is foreseen that the relative proportions and dimensions of the illustrative embodiments may vary—for example because of varied thermal and/or electrical outputs and/or emissions of controller components and/or selected material properties—without departing from the spirit of the present invention, as described in more detail below.

Preferably, the metal insert 54 is positioned adjacent to and/or is conductively connected to at least one primary heat and/or EMI source housed in or adjacent to the controller compartment 66. The metal insert 54 preferably transfers heat and/or dissipates EMI emissions generated and/or conducted by such source(s) with rapidity and efficiency, and may moderate the EMI emissions and/or temperature within the controller compartment 66 during operation of the motor 12.

In the illustrated embodiment, the power module 76 of the components 64 abuts and is thermally connected to the metal insert 54. That is, the power module 76 transfers thermal energy to the metal insert 54 directly through conductive contact and/or indirectly via conductive contact with one or more intermediaries having relatively favorable heat transfer properties and dimensions for heat transfer. More preferably, the heat transfer properties of any such intermediary are at least as conducive to heat transfer as the material(s) comprising the metal insert 54, and are dimensioned so as to provide for efficient heat transfer to the metal insert 54.

More particularly, the metal insert 54 preferably includes a substantially planar interior surface 78. Power module 76 preferably includes a broad, and preferably substantially planar, outward-facing surface 79 that sits adjacent and substantially parallel to the interior surface 78. Sandwiched between the power module 76 and the metal insert 54 is preferably a thermal conductive sheet 80 for absorbing heat from the power module 76 and distributing same across a broader surface area along the interface with interior surface 78 of the metal insert 54. The thermal conductive sheet 80 preferably comprises aluminum, but may also comprise zinc, copper or the like without departing from the spirit of the present invention. It is not necessary in some aspects of the present invention for an interior surface and an outward-facing surface of a metal insert to be complemental in shape, however. Where included, it is important for the conductive component to be sandwiched therebetween, but the shapes and sizes of the interior and outward-facing surfaces may be different.

Moreover, grounding the conductive sheet 80 and/or insert 54 (for example, to the shell 26) may help dissipate EMI conductive and/or radiated emissions from the PCB 60, power module 76 and/or other components 64. It is foreseen that placement of other electronics components and/or parts of a motor near and/or in conductive connection with a metal insert may be prioritized without departing from the spirit of the present inventive concept. For instance, capacitors and/or a bridge of the motor may be good candidates for such placement.

The power module 76, conductive sheet 80, and metal insert 54 are preferably fixed together by the fasteners 74. More particularly, fasteners 74 extend through two aligned sets of holes formed through the metal insert 54 and through opposing sides of the conductive sheet 80 and power module 76. Interior ends of the fasteners 74 may be secured to a rigid strip 82 inside the controller compartment 66. For instance, the fasteners 74 may comprise threaded bolts received within correspondingly threaded apertures defined by the rigid strip 82. The rigid strip 82 may be at least as wide as the power module 76, and may be formed of insulative material. The PCB 60, components 64, power module 76 and/or the planar surface 78 can be selectively positioned at a plurality of locations relative to the metal insert 54.

The rigid strip 82 may substantially hold the power module 76 against the conductive sheet 80, thereby helping to maintain efficient heat transfer therebetween. The rigid strip 82 may also inhibit heat transfer into the controller compartment 66, at least by covering a portion of an inner face of the power module 76 with insulative material. In an embodiment, such insulative material may comprise the material that forms the can housing 56. It is foreseen that other means of fastening and/or maintaining conductive contact between a metal insert and heat and/or EMI source (s) within a controller compartment may be employed without departing from the spirit of the present inventive concept.

The metal insert 54 preferably also defines a plurality of heat transfer fins 84, as illustrated in the Figures. The fins 84 are configured to disperse heat from the controller compartment 66. In a preferred embodiment, the plurality of fins 84 extend generally axially at least partly along the axial extent of the controller compartment 66, and at least substantially to or beyond an outer axial side of the conductive sheet 80. Other heat transfer-enhancing surface structure may be incorporated into a metal insert and/or controller can more generally without departing from the spirit of the present invention.

It should be noted that a preferred interior margin presented along interior surface 78 of the metal insert 54 differs substantially from a preferred outer margin 86 presented by the metal insert 54. (See FIG. 9) Whereas the interior surface 78 is preferably substantially flat and optimized to maximize surface area for conductive heat transfer directly from an electronic component 64 such as the power module 76, the outer margin 86 of the metal insert 54 is substantially arcuate (though the exposed surface area of the metal insert 54 may be discontinuous in view of the fins 84 and recess 52). The substantially arcuate outer margin 86 of the metal insert 54—together with the fins 84—help increase surface area for heat exchange with the external heat sink space. In this manner, a preferred metal insert may present inner and outer margins of substantially different shape and/or configuration—i.e., a substantially flat inner margin and a substantially arcuate outer margin—for enhanced heat transfer to the external heat sink space. One of ordinary skill will appreciate that inner and outer margins of a metal insert may be otherwise configured to enhance moderation of temperature and/or EMI emissions within a controller can within the scope of the present invention.

The metal insert 54 partially circumscribes the controller compartment 66 adjacent the second axial end 34, and extends axially along a substantial portion of controller compartment 66. The relative expanse of the illustrative metal insert 54 is therefore representative of a configuration that may sufficiently moderate temperature and/or EMI emissions within the controller compartment 66 to acceptable levels during certain exemplary operational conditions, as discussed in more detail above. The configuration of the illustrated embodiment preferably permits placement of the controller 58 in proximity to the end plate 44 (see FIG. 7) relative to prior designs. The can 28 may include short spacer(s) 90 for maintaining modest spacing between the end plate 44 and the controller 58.

In the preferred embodiment, the aforementioned positioning of controller 58 within controller can 28 permits orientation of electronics components 64 along the PCB 60 so as to maximize surface area exposed to an interior of the controller compartment 66. Generally, placement of the PCB 60 closer to the end plate 44 may provide sufficient "headroom"—or axial spacing from the second endshield 24—within the controller compartment 66 to allow the components 64 to be "stood up." This may enhance heat transfer within the controller compartment 66 for temperature moderation, for example where air circulation between the controller compartment 66 and the stator compartment 40 (for example, via apertures in the second endshield 24) helps ventilate and move heat away from the components 64. In preferred embodiments, enabling placement of PCB 60 and/or components 64 closer to portions of the can housing 56—i.e., through moderating temperature and/or EMI emissions within the controller compartment 66 using metal insert 54—may also simplify manufacturing (for example, casting) processes and reduce costs.

It should be noted that, in varying applications and/or under varying conditions, the sufficiency of the size of a metal insert may vary according to factors such as: the amount of heat and/or EMI emissions convected and/or radiated from and/or conducted via components and parts adjacent to or within the controller can; the temperature gradient between the interior and exterior of the controller can; the proximity of the metal insert to the primary heat and/or EMI emission source(s) and/or insulative barriers therebetween; and other factors that may become apparent to one of ordinary skill upon review of this disclosure. For instance, it is foreseen that, in other embodiments, the heat transfer demands on an insert—and, therefore, the recommended dimensions and placement thereof within the can housing—may vary during normal operational cycles of the motor. The degree of power supplied to the motor and the ambient temperature may vary during normal operational cycles, and normal variances such as these are preferably considered when dimensioning the insert. Moreover, a metal insert may in some embodiments help dispel heat generated by operation of the motor within or immediately adjacent a stator compartment, which may also be taken into account in designing a controller can according to the present invention.

It is foreseen that the positioning of a metal insert with respect to a PCB, electronics components and/or other heat-producing and/or conducting elements within a controller can may be varied to maximize the rate of heat transfer to the exterior and/or to achieve other design goals without departing from the spirit of the present inventive concept. Likewise, it is foreseen that the span and/or axial length of a metal insert, along with its thickness, may be varied according to the heat transfer requirements of particular motors without departing from the spirit of the present inventive concept.

Can housing 56 material may be selected from a group of materials having relatively low heat conductivity. More particularly, each such material may be selected for its ability to remain at or below a certain temperature during operation of motor 12, thereby preventing heat damage that may otherwise be caused by proximity of the can housing 56 (for example, an inner surface of end plate 44) to the controller 58 (for example, to traces of the PCB 60 and/or components 64). Preferably, the can housing 56 may comprise a plastic. More preferably, the can housing 56 comprises a polycarbonate. It is also foreseen that the can housing 56 may comprise stamped steel or other synthetic materials without departing from the spirit of the present invention. It should be noted that certain grounding techniques for dispersing EMI emissions from the controller compartment 66 may be unavailable where a relatively poor conductor (for example, polycarbonate) is chosen for use in constructing the can housing 56.

In contrast, the material of the metal insert 54 is preferably selected from a group of metals having relatively high thermal conductivity. More particularly, each such metal is preferably selected for its ability to transfer heat efficiently and quickly from the controller compartment 66 to the external heat sink space. Preferably, the selected metal exhibits a thermal conductivity (for example, in watts per square meter) at least four (4) times that of the material(s) comprising the can housing 56. More preferably, the thermal conductivity of the metal comprising the metal insert 54 is at least about ten (10) times that of the material(s) comprising the can housing 56. The metal insert 54 preferably comprises aluminum, but may also comprise zinc, copper, combinations of the foregoing, or the like. It is foreseen that the selection of the material(s) comprising can housing 56 and metal insert 54 may vary with geometric, compositional and/or operational parameters across various applications, and that such selection will be within the abilities of one of ordinary skill upon review of this disclosure.

The preferred embodiment described herein provides numerous advantages. Among other things, for instance, the can housing 56 preferably provides a less damaging surface for positioning adjacent sensitive components such as the traces of PCB 60 and/or components 64, as compared with prior art controller cans, without the need for expensive and/or cumbersome insulative inserts or the like. This preferably provides additional space within which components 64 may be positioned advantageously within the controller compartment 66 to, for example, prevent obstruction of ventilation passing through the second endshield 24 from the stator compartment 40 and optimize the profile thereof to maximize ventilation, as described in more detail above.

It is preferred that substantially all of the can housing 56 consists of a low-conductivity material (such as a material A), and that substantially all of the metal insert 54 consists of a relatively high-conductivity material (such as a material B). However, it should be noted that the can 28, the can housing 56, the end plate 44, the skirt 46 and/or the metal insert 54 may each be formed of multiple materials without departing from the spirit of the present invention. In an embodiment, at least seventy percent (70%) (by volume) of the end plate 44 consists of a homogenous material A (for example, a polycarbonate or a stamped steel), providing a relatively low-temperature surface near which components 64 may be disposed with reduced risk of heat damage. Similarly, at least seventy percent (70%) (by volume) of the metal insert 54 may consist of a homogenous material B (for example, aluminum), providing a relatively high thermal conductivity material for dissipating heat to an external heat sink space.

In such an embodiment, for example, portions of an end plate—for example, areas not sitting adjacent PCB and/or electronic components—may be formed of relatively high thermal-conductivity material(s) within the scope of the present invention. Substantially all portions of an end plate that are adjacent (for example, in axial alignment with) a PCB and/or electronic component are preferably formed of a relatively low thermal conductivity material. Likewise, portions of a metal insert—for example, those not sitting adjacent (that is, in radial alignment with) a significant heat source of the electronic components—may be formed of relatively low thermal-conductivity material(s) within the scope of the present invention.

It will therefore be apparent to one having ordinary skill that the following advantages may be addressed in embodiments of the present invention: positioning of relatively high thermal-conductivity portion(s) of a metal insert within a controller can adjacent significant heat source(s); positioning of relatively low thermal-conductivity portion(s) of an end plate adjacent heat-sensitive controller components; and providing a controller can wherein between about ten percent (10%) and about forty percent (40%), and more preferably between about twenty percent (20%) and about thirty percent (30%), of the exposed surface area of the can 28 is presented by a homogenous and relatively high thermal-conductivity material (such as aluminum) of the metal insert, in order to provide for enhanced heat transfer from a controller compartment.

Moreover, the can housing 56 may be configured to optimize electrical communication between the can 28 and the controller 58 according, for example, to the degree of grounding required to control EMI emissions. In an embodiment, at least one spacer 90a comprises a cast ground mounting pad formed integrally with and/or otherwise in conductive communication with the metal insert 54, for example by being cast or otherwise monolothically formed with the metal insert 54 and/or welded thereto. (See FIG. 7) Preferably, the cast ground mounting pad spacer 90a comprises a conductive material the same as or complementary to that comprising the metal insert 54. For instance, the mounting pad spacer 90a may comprise aluminum, but may also comprise zinc, copper, combinations thereof, or the like. The cast ground mounting pad spacer 90a may be fastened to the PCB 60 and/or one or more components 64 by a fastener 92. Preferably, the fastener 92 also comprises electrically conductive material such as aluminum, zinc, copper or the like. Electrical communication between the PCB 60 and the cast ground mounting pad spacer 90a may occur, for example, along traces (not shown) of the PCB 60.

Particularly in embodiments in which the can housing 56 comprises material of low thermal and/or electrical conductivity, the illustrated cast ground mounting pad spacer 90a may help ground and/or dissipate EMI emissions from the PCB 60 and/or components 64. More particularly, the cast ground mounting pad spacer 90a may conduct heat and/or EMI emissions to the metal insert 54. These effects may be improved still further through electrical communication between the metal insert 54 and one or both of the second endshield 24 and shell 26, for example because of the surface contact therebetween along the second axial end 34 of the shell 26 in the illustrated embodiment. One of ordinary skill will appreciate that the controller 58 (for example, the PCB 60 and/or components 64) may also or alternatively be ground by and/or may dissipate EMI emissions via electrical communication with the can housing 56 and/or otherwise with the second endshield 24 and/or shell 26 (for example, via a ground wire) within the scope of the present invention.

It should be noted that references herein to "external heat sink space(s)" and the like generally refer to the surroundings of a controller can, and there is no requirement that such "space(s)" comprise open-air areas or otherwise include gaseous mixtures, it being understood that "external heat sink space(s)" may comprise cooling liquids and/or enclosed compartments without departing from the spirit of the present invention. Similarly, one of ordinary skill will appreciate that the term "exposed surface area" as used herein refers to exposure of surface area to the surroundings of the controller can (rather than being internal to the motor), and there is no requirement that such surface area be "exposed" to any particular substance to be considered "exposed surface area."

Although the above description presents features of preferred embodiments of the present invention, other preferred embodiments may also be created in keeping with the principles of the invention. Furthermore, these other preferred embodiments may in some instances be realized through a combination of features compatible for use together despite having been presented independently as part of separate embodiments in the above description.

The preferred forms of the invention described above are to be used as illustration only and should not be utilized in a limiting sense in interpreting the scope of the present invention. Modifications to the exemplary embodiments, as hereinabove set forth, could be readily made by those skilled in the art without departing from the spirit of the present invention.

What is claimed is:

1. An electric motor comprising:
   a rotor rotatable about an axis;
   a stator;
   a motor housing including a controller can having a metal insert; and
   a controller including an electronic component, the electronic component being disposed within the controller can,
   the metal insert being thermally connected to the electronic component.

2. The electric motor of claim 1, wherein—
   the controller can includes a can housing,
   the can housing and the metal insert together present an exposed surface area,
   the metal insert presents between about ten percent (10%) and about forty percent (40%) of the exposed surface area.

3. The electric motor of claim 1, wherein—
   the controller can includes a can housing having an end plate,
   the metal insert extends substantially transversely relative to the end plate,
   the metal insert comprises thermally conductive material;
   the end plate comprises a thermally insulative material having a thermal conductivity at least four (4) times less than a thermal conductivity of the thermally conductive material.

4. The electric motor of claim 3, wherein—
   the controller includes a printed circuit board extending substantially in parallel with and adjacent to the end plate,
   the electronic component is mounted on the printed circuit board.

5. The electric motor of claim 4, wherein—
the motor housing includes a motor shell,
the printed circuit board is mounted to a spacer disposed between the printed circuit board and the end plate,
the spacer comprises a ground mounting pad in electrical communication with the metal insert,
the metal insert is in electrical communication with the shell to provide for grounding of the printed circuit board.

6. The electric motor of claim 5, wherein the spacer is integrally formed with the metal insert.

7. The electric motor of claim 3, wherein—
the can housing and the metal insert together present an exposed surface area,
the metal insert presents between about ten percent (10%) and about forty percent (40%) of the exposed surface area.

8. The electric motor of claim 3, wherein the thermally conductive material is selected from the group consisting of: aluminum, zinc, copper, and combinations thereof.

9. The electric motor of claim 1, wherein—
the metal insert includes an interior surface,
the electric motor includes a thermal conductive sheet in engagement with the interior surface,
the thermal conductive sheet is disposed between the metal insert and the electronic component.

10. The electric motor of claim 9, wherein the metal insert has an outer surface comprising a plurality of heat transfer fins.

11. The electric motor of claim 1, wherein the controller can includes a can housing comprising a skirt.

12. The electric motor of claim 11, wherein the skirt defines a plurality of arcuately spaced drainage holes.

13. The electric motor of claim 11, wherein the metal insert is removably fixed relative to the skirt.

14. The electric motor of claim 13, wherein—
the skirt includes two pairs of flanges,
each pair of flanges is arcuately spaced from the other,
the pairs of flanges generally extend axially along opposite sides of an opening in the skirt,
each pair of flanges includes an inner flange spaced radially inside an outer flange,
the metal insert spans the opening in the skirt and is fit radially between the inner flange and the outer flange of each of the two pairs of flanges to substantially restrict radial movement of the metal insert with respect to the skirt.

15. The electric motor of claim 14, wherein the fitting of the metal insert between the two pairs of flanges substantially restricts circumferential movement of the metal insert with respect to the skirt.

16. The electric motor of claim 13, wherein the electronic component is removably fixed to the metal insert by at least one fastener, the at least one fastener at least partly restricting axial movement of the metal insert with respect to the skirt.

17. The electric motor of claim 16, wherein the at least one fastener comprises an electrically conductive metal.

18. The electric motor of claim 16, further including a rigid strip removably fixing the electronic component to the metal insert in the controller compartment, the rigid strip receiving and being fixed to each interior end of the at least one fastener.

19. An electric motor comprising:
a rotor;
a stator; and
a motor housing including a controller can,
the controller can having an end plate and a metal insert extending substantially transversely relative to the end plate,
the metal insert comprising thermally conductive material;
the end plate comprising a thermally insulative material having a thermal conductivity at least four (4) times less than that of the thermally conductive material.

20. The electric motor of claim 19, wherein—
the controller can includes a skirt projecting substantially transversely relative to the end plate,
the end plate, the skirt and the metal insert together present an outer surface area,
the thermally conductive material of the metal insert presents between about ten percent (10%) and about forty percent (40%) of the outer surface area.

\* \* \* \* \*